United States Patent
Wang et al.

(10) Patent No.: US 7,730,373 B2
(45) Date of Patent: Jun. 1, 2010

(54) TEST DATA COMPRESSION METHOD FOR SYSTEM-ON-CHIP USING LINEAR-FEEDBACK SHIFT REGISTER RESEEDING

(75) Inventors: Zhanglei Wang, Santa Clara, CA (US); Seongmoon Wang, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 426 days.

(21) Appl. No.: 11/839,190

(22) Filed: Aug. 15, 2007

(65) Prior Publication Data

US 2008/0065940 A1 Mar. 13, 2008

Related U.S. Application Data

(60) Provisional application No. 60/825,281, filed on Sep. 12, 2006.

(51) Int. Cl.
*G01R 31/28* (2006.01)
(52) U.S. Cl. .......... 714/729; 714/731; 714/715; 714/741; 714/25; 714/724; 714/738; 714/739; 714/733; 714/30; 714/726; 714/727; 709/220; 709/200; 716/4; 716/5; 716/6; 703/23; 324/601

(58) Field of Classification Search .......... None
See application file for complete search history.

(56) References Cited

U.S. PATENT DOCUMENTS

| 7,159,161 | B2 * | 1/2007 | Lee et al. ............ 714/738 |
| 7,225,376 | B2 * | 5/2007 | Appinger et al. ........ 714/738 |
| 7,555,688 | B2 * | 6/2009 | Alvamani et al. ........ 714/729 |
| 2006/0236176 | A1 * | 10/2006 | Alyamani et al. ........ 714/726 |
| 2007/0260952 | A1 * | 11/2007 | Devanathan et al. ...... 714/726 |
| 2007/0300110 | A1 * | 12/2007 | Rajski et al. ............ 714/728 |

OTHER PUBLICATIONS

Volkerink et al, "Efficient seed utilization for reseeding based compression," in Proc. VTS 2003, pp. 232-237.*

* cited by examiner

*Primary Examiner*—John P Trimmings
(74) *Attorney, Agent, or Firm*—Joseph J. Kolodka

(57) ABSTRACT

A method includes obtaining an equivalent core of multiple cores in a System-on-Chip circuit, and applying linear-feedback shift register LFSR reseeding for compressing test data of the equivalent core.

18 Claims, 5 Drawing Sheets

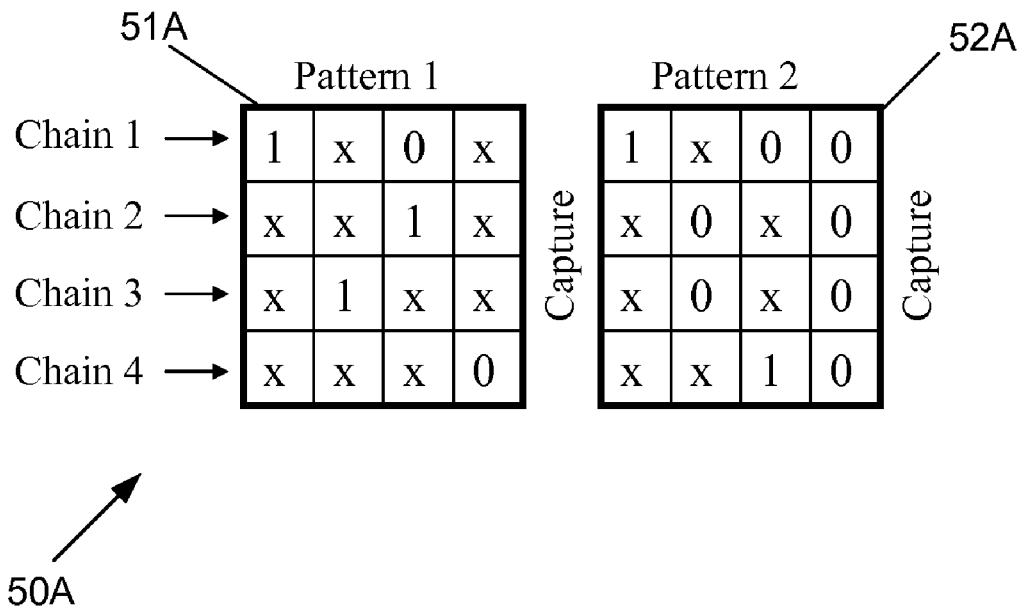
FIG 5A (CORE A)
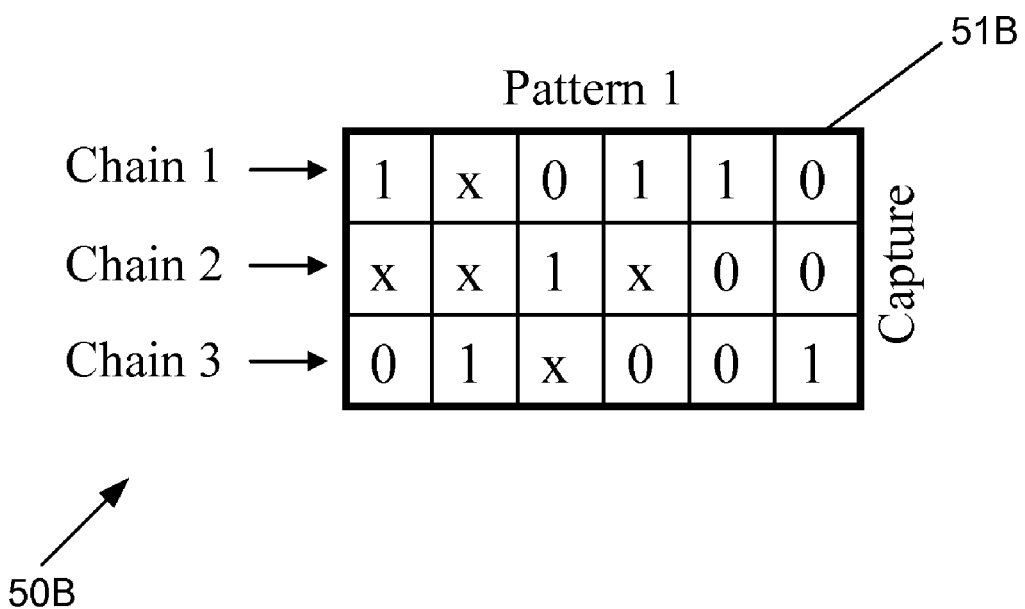
FIG 5B (CORE B)

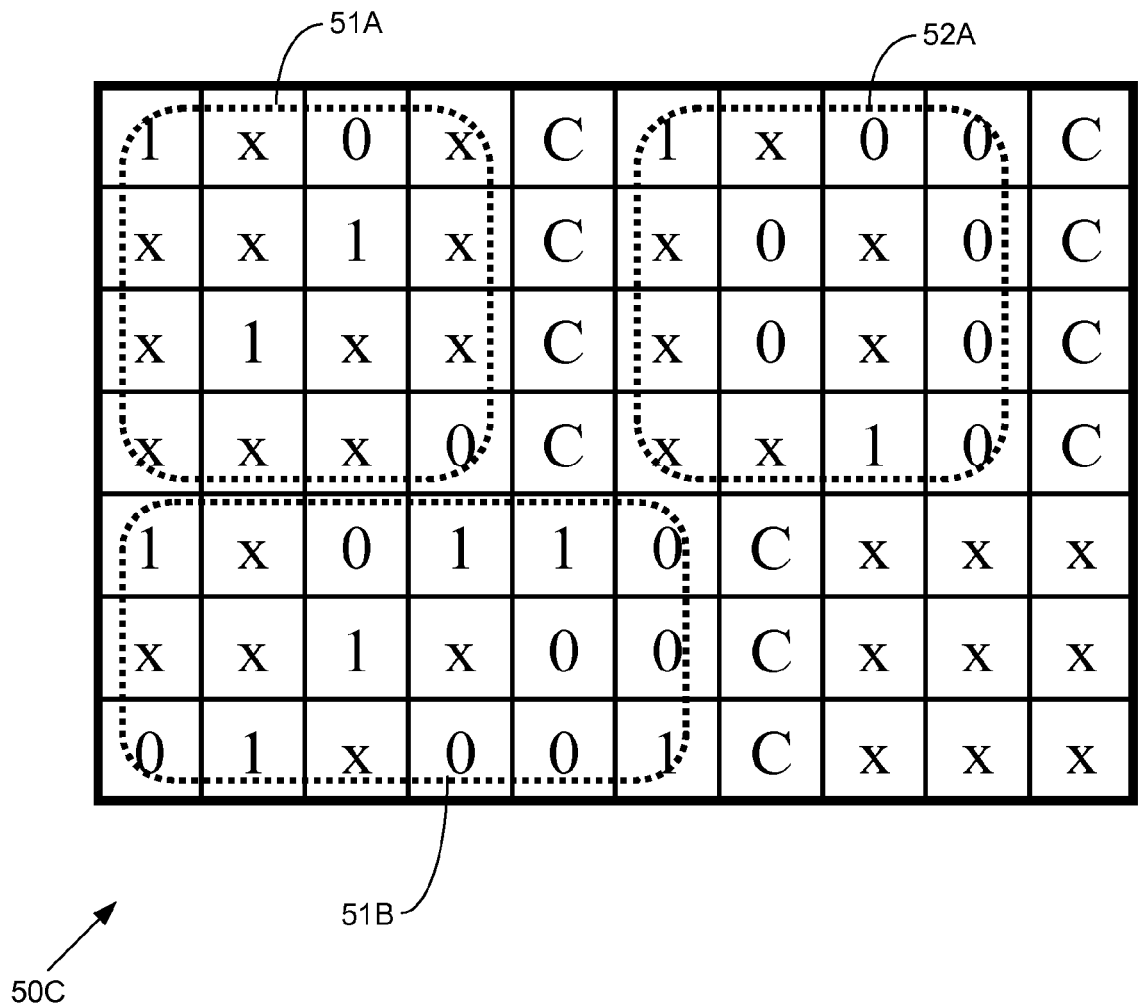
FIG 5C (EQUIVALENT CORE)

TEST DATA COMPRESSION METHOD FOR SYSTEM-ON-CHIP USING LINEAR-FEEDBACK SHIFT REGISTER RESEEDING

This application claims the benefit of U.S. Provisional Application No. 60/825,281, entitled "SoC testing Approach Using LFSR Reseeding and Scan Sliced-based TAM Optimization and test Sheduling", filed on Sep. 12, 2006, the contents of which is incorporated by reference herein.

BACKGROUND OF THE INVENTION

The present invention relates generally to test data compression in manufacture testing, and, more particularly, to a test data compression method for System-on-Chip (SoC) using linear-feedback shift register reseeding.

The following works by others are mentioned in the application and referred to by their associated reference:

[1] J. Rajski, I. Tyszer, M. Kassab, and N. Mukherjee, "Embedded deterministic test," in IEEE Tran. CAD, vol. 23, pp. 776-792, May 2004.
[2] E. J. Marinissen, R. Kapur, M. Lousberg, T. McLaurin, M. Ricchetti, and Y. Zorian, "On IEEE 1500's standard for embedded core test," in Journal of Electronic Testing: Theory and Applications (JETTA), vol. 18, pp. 365-383, August 2002.
[3] V. Iyengar, K. Chakrabarty, and E. J. Marinissen, "Test access mechanism optimization, test scheduling, and tester data volume reduction for System-on-Chip," in IEEE Trans. Computers, vol. 52, pp. 1619-1632, December 2003.
[4] A. B. Kinsman and N. Nicolici, "Time-multiplexed test data decompression architecture for core-based socs with improved utilization of tester channels," in Proc. European Test Symp., 2005, pp. 196-201.
[5] P. T. Gonciari and B. M. Al-Hashimi, "A compression-driven test access mechanism design approach," in Proc. European Test Symp., 2004, pp. 100-105.
[6] E. H. Volkerink and S. Mitra, "Efficient seed utilization for reseeding based compression," in Proc. VTS 2003, pp. 232-237.

Test data compression has been widely used in manufacturing testing. To achieve high reduction in both test data volume and test application time, some state-of-the-art compression techniques such as [1] usually use special test generation tools to generate test patterns that are suitable to achieve maximum compression. The configuration of scan chains is also optimized for better compression results. However, when testing System-on-Chip (SoC) devices, these flexibilities are usually not available because no structural information is available for some intellectual property (IP) cores, especially, hard cores that are delivered in the form of layouts and whose scan chain configurations cannot be modified.

In addition to the problem of limited applicability of existing test compression techniques, restricted access to internal cores is another issue in SoC testing. To tackle with this restriction, test access mechanism (TAM) and test wrappers have been proposed as key components of an SoC test architecture [2]. Many techniques have been proposed to co-optimize TAM/wrapper design and test scheduling to reduce test application time for SoCs [3]. However, these techniques either do not consider test data compression, or utilize less efficient compression techniques.

Intuitively, the SoC integrator has the flexibility to combine test data compression, TAM/wrapper design, and test scheduling into a unified problem formulation, and hence to achieve decreased test data volume and test application time for the entire SoC. Prior work [4] presents a time-multiplexing technique to reduce test application for SoCs that support test data compression. The major drawback of [4] is that extra data and on-Chip hardware are needed to enable the time-multiplexing mechanism. To keep the multiplexing mechanism easy-to-implement, [4] resorts to fixed length blocks, which will however decrease the encoding efficiency. An optimal block length for one core is not necessarily optimal for other cores. Prior work [5] uses XOR network called XNet for compression, which is less efficient for high compression. It also requires two different data streams from the ATE: data and load control streams.

The diagram 10 of FIG. 1 shows the core configuration for prior art [4]. In the FIG. 1, DCMP means decompressor and can be a linear-feedback shift register LFSR. Each core, core 1, core 2, core 3 and core 4, has its own decoder. In addition, a control unit 14 is needed to route seed data 15 to the core designated by the control data. The diagram 20 of FIG. 2 shows how seed streams are packed into one stream, i.e., how tester channels are time-multiplexed. It also shows how control data are determined. Cores in an SoC are compressed individually using LFSR reseeding. Tester channels are time-multiplexed to transfer seed data to the on-Chip decompressors when necessary. To perform seed calculation, test patterns of each core are first split into blocks of fixed length. A seed is obtained by solving linear equations formed by care bits from variable number of blocks. As many as possible blocks are concatenated before a new seed is generated. When an LFSR decoder is expanding a seed to a series of blocks, it does not need to receive data from the tester, until all blocks encoded by this seed have been generated. Hence, seed streams for different cores can be time-multiplexed (or packed) together into a single stream. The overall test application time is therefore reduced by testing cores simultaneously in a time-multiplexing fashion.

The major drawback of architecture of FIG. 1 is that extra data and on-Chip hardware are needed to enable the time-multiplexing mechanism. To keep the multiplexing mechanism easy-to-implement, [4] resorts to fixed length blocks, which will however decrease the encoding efficiency. An optimal block length for one core is not necessarily optimal for other cores.

The diagram 30 of FIG. 3 shows the XNet architecture used in prior art [5]. The LFSR and the phase shifter of the invention shown in FIG. 4A are replaced by a shift register (SR) 31 and an XOR network 32 called XNet. A data word is loaded into the SR to generate a pattern for a scan slice. If a pattern for a scan slice has many care bits, then it may not be possible to find a data word that can justify the pattern for the slice. To account for this problem, a separate load control stream is provided from the automatic test equipment ATE to control operation of the wrapper scan chains WSCs ($WSC_1$, $WSC_2$, $WSC_3$, $WSC_4$), which feed into the multiple input shift register MISR. If values required for some WSCs cannot be justified in a cycle, then the only WSCs for which values are justified are loaded with new values and the other WSCs hold. Then another data word is loaded into the shift register SR 31 to load the rest of the WSCs, which were not loaded in the previous cycle. Since the operation of each WSC should be individually controlled, data to generate load streams can be significant. Hence, achieving high compression by this scheme is difficult.

Accordingly, there is a need for a method applicable to an SoC chip that reduces test application time and achieves maximum compression.

SUMMARY OF THE INVENTION

In accordance with the invention, a method includes obtaining an equivalent core of multiple cores in a System-on-Chip circuit, and applying linear-feedback shift register LFSR reseeding for compressing test data of the equivalent core. In the preferred embodiment, the step of obtaining includes having more care bits per slice scan for the equivalent core than for the multiple cores and having a care-bit distribution over scan slices which is more flat for the equivalent core than for the multiple cores, thereby improving coding efficiency. Preferably, the step of obtaining the equivalent core includes expanding seed data of the linear-feedback shift register LFSR to test data for improving coding efficiency. The linear-feedback shift register LFSR simultaneously feeds the expanded seed to the multiple cores. The step of obtaining the equivalent core includes space multiplexing the multiple cores.

In another aspect of the invention, a System-on-Chip test apparatus includes a linear-feedback shift register LFSR; a phase shifter with input coupled to output of the LFSR; at least two intellectual property cores in parallel, and an internal test access mechanism TAM interposed between the phase shifter and the cores; wherein an equivalent core of the multiple cores is obtained and test data to the equivalent core is compressed from reseeding by the linear-feedback shift register. Preferably, each core has a separate control signal enabling the respective core for its scheduled test interval and the at least two cores are tested in parallel such that testing time and encoding efficiency can be optimized simultaneously. Preferably, the equivalent core has more care bits per slice scan than the at least two cores and has a care-bit distribution over scan slices which is more flat than for the at least two cores, thereby improving coding efficiency.

BRIEF DESCRIPTION OF DRAWINGS

These and other advantages of the invention will be apparent to those of ordinary skill in the art by reference to the following detailed description and the accompanying drawings.

FIG. 5A depicts a core A with two test patterns for illustrative purposes.

FIG. 5B depicts a core B with a test pattern for illustrative purposes.

FIG. 5C depicts an equivalent core of the two cores A and B of FIGS. 5A and 5C.

DETAILED DESCRIPTION

Figure 1:
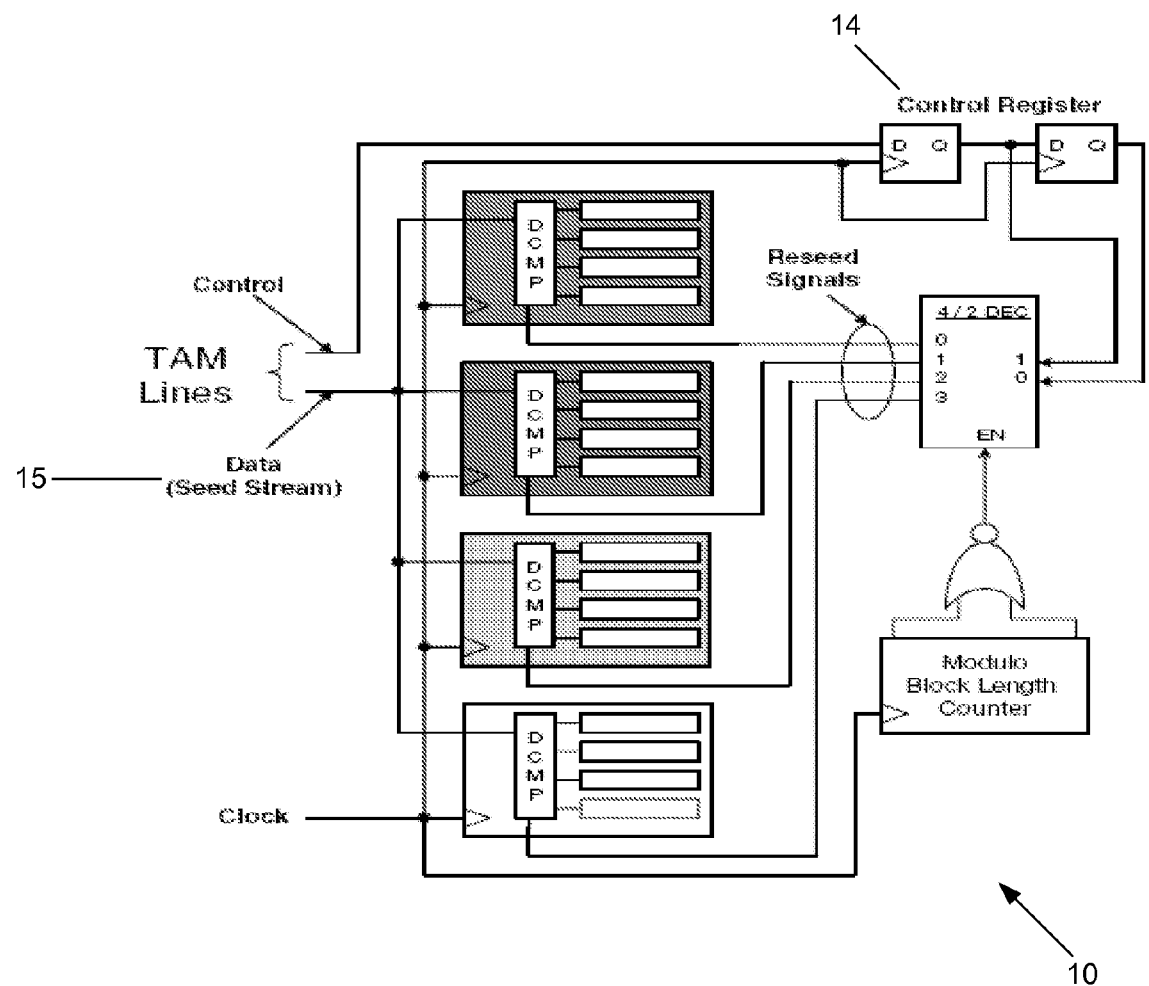
FIG. 1 is a diagram of a core configuration in which cores in a System-on-Chip SoC are compressed individually using linear feedback shift register LFSR reseeding, according to the prior art.
Figure 2:
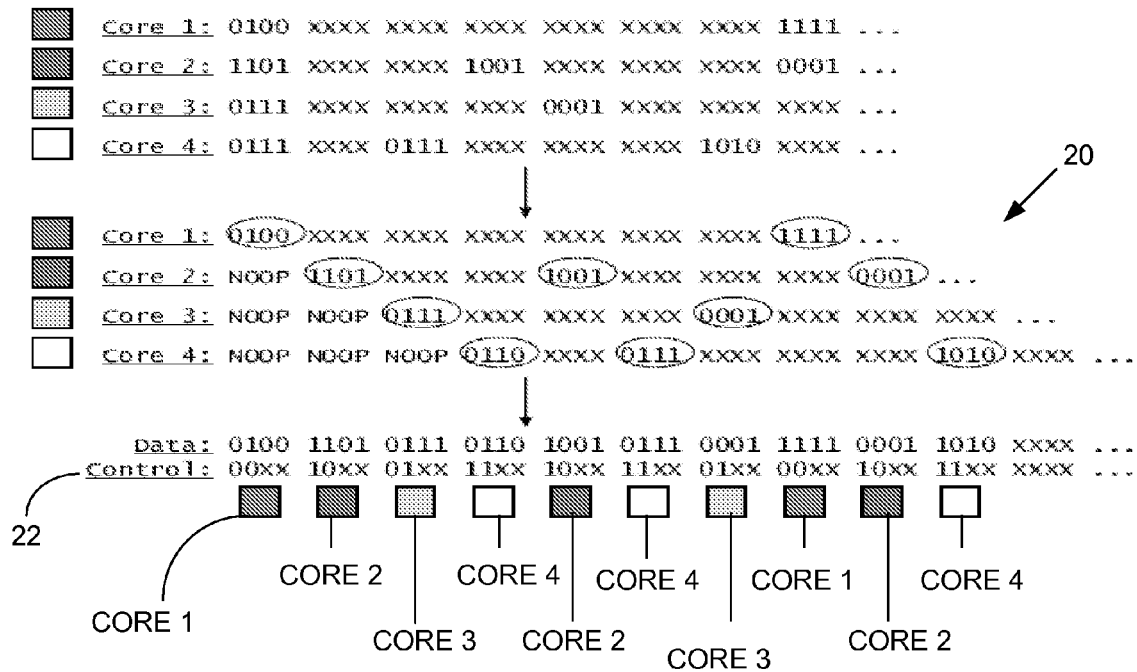
FIG. 2 illustrates how seed streams are packed onto one stream, i.e., how tester channels are time multiplexed, with configuration of FIG. 1.
Figure 3:
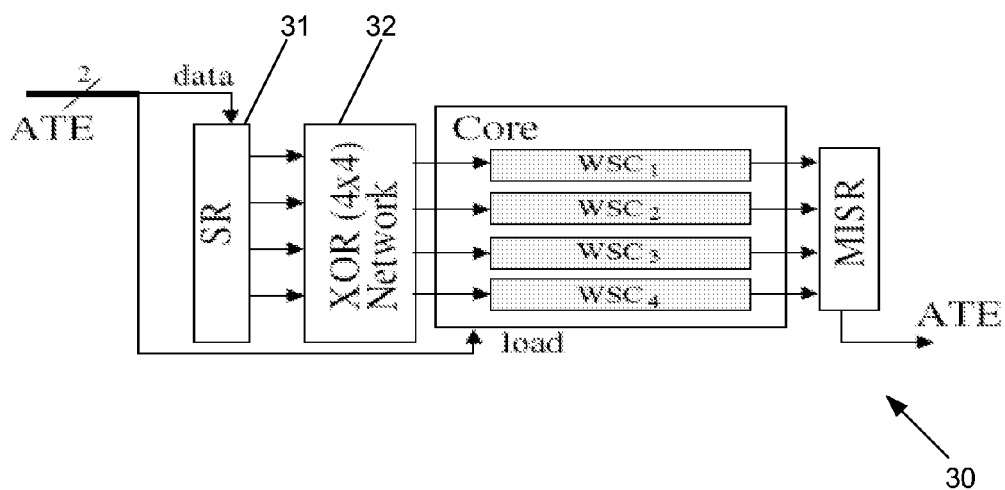
FIG. 3 is a diagram of an exclusive OR network (Xnet) architecture according to the prior art.
Figure 4A:
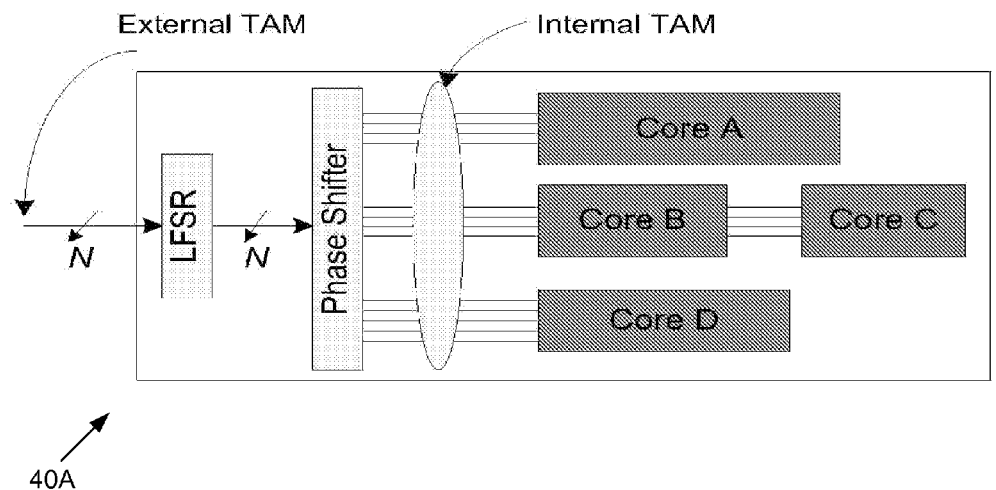
FIG. 4A is a block diagram of a System-on-Chip SoC architecture in accordance with the invention.
Figure 4B:
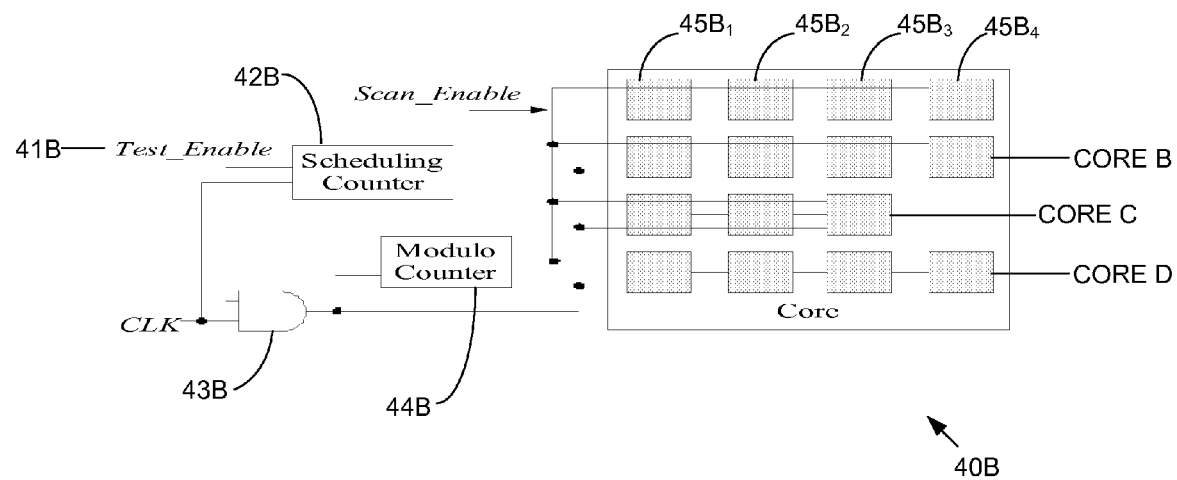
FIG. 4B is a diagram of a system clock for the inventive architecture depicted in FIG. 4A.

The invention employs an improved LFSR reseeding technique in [1] to test multiple cores on a System-on-Chip SoC in parallel, such that the testing time and encoding efficiency can be optimized simultaneously. An exemplary embodiment of a test architecture 40A according to the invention is shown in FIGS. 4A and 4B. FIG. 4A depicts an exemplary System-on-Chip SoC architecture in accordance with the invention and FIG. 4B depicts an exemplary system clock 40B for the architecture of FIG. 4A.

Each of the cores, Core A, Core B, Core C and Core D, is individually scheduled to be tested during one or more arbitrary time intervals. For example, if a core A is scheduled to be testing during time $(t_0, t_1)$, then A starts receiving data from the phase shifter at time $t_0$, and stops testing before time $t_1$. Therefore, each core should have a separate Test_Enable control signal 41B, coupled to the scheduling counter 42B, which is active only during the scheduled time intervals. The Test_Enable signal is AND-gated 43B with the system clock as shown in FIG. 4B. The Test_Enable signals are generated using on-Chip counters according to scheduling data that are also stored on-Chip. Experimental results show that in most cases one core will only be assigned one time interval, the storage size of the scheduling data is very limited.

Each core, Core A, Core B, Core C and Core D, has also an on-Chip modulo counter 44B that controls when it should scan in test data, capture output responses, and scan out output responses. The output of the modulo counter is connected to the Scan_Enable inputs of each scan cell of each Core, as shown in FIG. 4B. Scan cells of Core A are depicted with reference numerals, e.g., $45B_1$, $45B_2$, $45B_3$, $45B_4$. For clarity in viewing diagram 40B, reference numerals for scan cells for Cores B, C and D are omitted. The modulo counter 44B only depends on the lengths of the wrapper scan chains of the core.

At any time instant or clock cycles the linear feedback shift register LFSR expands its seed to test data, and simultaneously feeds multiple cores through the phase shifter. The care bits that are encoded in the seed come from different cores. Hence, cores are space-multiplexed. From the linear-feedback shift register's LFSR's point of view, the SoC is tested as a monolithic core, referred to as the equivalent core of the SoC. By carefully designing the test access mechanism TAM and test wrappers, together with proper test scheduling, an equivalent core can be obtained whose testing time is minimized. Thereafter, the LFSR reseeding technique in [6] is applied to compress the test data of the equivalent core.

The advantages of space-multiplexing are:
(1) Multiple cores are tested in parallel. Compared with each individual core, the equivalent core will have more care bits per scan slice, and its care-bit distribution over scan slices is more "flat". This helps improve the encoding efficiency.

(2) When some cores are capturing, other cores can still receive data from the LFSR. This helps decrease the test application time.

As an example, FIGS. 5A, 5B and 5C and their respective diagrams 50A, 50B and 50C show how the equivalent core of two cores A and B is obtained, in accordance with the invention. Each row represents a WSC and each column represents a scan slice. Core A has 4 WSCs and patterns with each pattern having 4 scan slices. Core B has 3 WSCs and one pattern that has 6 scan slices. Both cores are scheduled for test starting from clock cycle 0. At clock cycle 5, core A is in the capture mode (marked as "C" or "Capture") while core B continues receiving data. The equivalent core 50C has 7 WSCs and 9 scan slices.

In other words, capture cycles are inserted between test patterns (marked as "C") during which the core captures output responses. In FIGS. 5A and 5B, both cores, Core A 51A and Core B 52A, are scheduled for test starting from time 0. When Core A is capturing, core B continues receiving data. The care-bit distribution over scan slices of the equivalent core is much flatter than that of Core A or Core B.

A TAM/test wrapper and test scheduling co-optimization process can be used to obtain an optimal equivalent core. This process ensures that for any scan slice of the equivalent core, the number of care bits does not exceed a user-defined parameter $S_{max}$, such that the LFSR can guarantee to encode at least one scan slice. Ideally, if $S_{max}$ tester channels are used, no shadow register is needed to store seeds for the LFSR, and the overall test application time is minimized. If fewer tester channels are used, sometimes the scan clock needs to be disabled until a new seed is completely transferred, resulting in increased test application time. However, experimental results show that, especially for large industrial circuits, most seeds can encode a sufficiently large number of scan slices, such that the next seed can be transferred in time. To improve encoding efficiency, the order of the LFSR can be set as k $S_{max}$,+20, k=1, 2, . . . , and the LFSR can thus encode at least k scan slices. If k>1, the ideal number of tester channels remains $S_{max}$, because each seed can encode at least k scan slices. The proposed process can be scalable for industrial designs. Experimental results testing the invention show that to schedule an SoC with a compound test set of 2.6 Gbits, the execution time is only 51 s, with 41 s spent on loading data from the disk.

In summary, the invention employs a linear-feedback shift register LFSR reseeding technique to test multiple cores on a System-on-Chip SoC in parallel, such that the testing time and encoding efficiency can be optimized simultaneously. The inventive SoC testing approach integrates test data compression, TAM/test wrapper design, and test scheduling. The LFSR reseeding technique is used as the compression engine. All cores on the SoC share a single on-Chip LFSR. At any clock cycle, one or more cores can simultaneously receive data from the LFSR. Seeds for the LFSR are computed from the care bits from the test cubes for multiple cores. We also propose a scan-slice-based scheduling algorithm that tries to maximize the number of care bits the LFSR can produce at each clock cycle, such that the overall test application time is minimized. The inventive approach has small hardware overhead and is easy to deploy. Only one LFSR, one phase shifter, and a few counters need to be added to the SoC. The scheduling process is also scalable for large industrial circuits.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

What is claimed is:

1. A method comprising the steps of:
   obtaining an equivalent core of multiple cores in a System-on-Chip circuit; and
   applying linear-feedback shift register LFSR reseeding for compressing test data of the equivalent core, wherein testing time of the equivalent core is optimized by ensuring that for any scan slice of the equivalent core, the number of care bits does not exceed a user defined parameter such that the LFSR can guarantee to encode at least one scan slice.

2. The method of claim 1, wherein the step of obtaining comprises having more care bits per slice scan for the equivalent core for any of each individual multiple core.

3. The method of claim 1, wherein the step of obtaining comprises having a care-bit distribution over scan slices which is more flat for the equivalent core than for any of each individual multiple core, thereby improving coding efficiency.

4. The method of claim 1, wherein the step of obtaining the equivalent core comprises expanding seed data of the linear-feedback shift register LFSR to test data for improving coding efficiency.

5. The method of claim 4, wherein the linear-feedback shift register LFSR simultaneously feeds the expanded seed to the multiple cores.

6. The method of claim 1, wherein the step of obtaining the equivalent core comprises space multiplexing the multiple cores.

7. The method of claim 1, wherein if the user-defined parameter number of tester channels are used no shadow register is needed to store seeds for the LFSR thereby minimizing overall test application time for the equivalent core.

8. The method of claim 1, wherein if fewer than the user-defined parameter number of tester channels are used a scan clock for testing the equivalent core can be disabled until a new seed is completely transferred from the LFSR to the multiple cores.

9. A System-on-Chip test apparatus comprising:
   a linear-feedback shift register LFSR;
   a phase shifter with input coupled to output of the LFSR;
   at least two intellectual property cores in parallel, and
   an internal test access mechanism TAM interposed between the phase shifter and the cores;
   wherein an equivalent core of the multiple cores is obtained and test data to the equivalent core is compressed from reseeding by the linear-feedback shift register, each core having a separate control signal enabling the respective core for its scheduled test interval.

10. The apparatus of claim 9, wherein the at least two cores are tested in parallel such that testing time and encoding efficiency can be optimized simultaneously.

11. The apparatus of claim 9, wherein the equivalent core has more care bits per slice scan than for any of the at least two cores.

12. The apparatus of claim 9, wherein the equivalent core has a care-bit distribution over scan slices which is more flat than for any of the at least two cores, thereby improving coding efficiency.

13. The apparatus of claim 9, wherein the equivalent core is obtained by expanding seed data of the linear-feedback shift register LFSR to test data for improving coding efficiency.

14. The apparatus of claim 13, wherein the linear-feedback shift register LFSR simultaneously feeds the expanded seed to the at least two cores.

15. The apparatus of claim 9, wherein the equivalent core is obtained by space multiplexing the at least two cores.

16. The apparatus of claim 9, wherein testing time of the equivalent core is optimized by ensuring that for any scan slice of the equivalent core, the number of care bits does not exceed a user defined parameter such that the LFSR can guarantee to encode at least one scan slice.

17. The apparatus of claim 16, wherein if the user-defined parameter number of tester channels are used no shadow register is needed to store seeds for the LFSR thereby minimizing overall test application time for the equivalent core.

18. The apparatus of claim 16, wherein if fewer than the user-defined parameter number of tester channels are used a scan clock for testing the equivalent core can be disabled until a new seed is completely transferred from the LFSR to the multiple cores.

\* \* \* \* \*